United States Patent  
Jacobowitz et al.

(10) Patent No.: US 6,597,840 B2
(45) Date of Patent: Jul. 22, 2003

(54) TUNABLE FIBER BRAGG GRATINGS AND WAVELENGTH-LOCKED LOOPS FOR DISPERSION COMPENSATION

(75) Inventors: Lawrence Jacobowitz, Wappingers Falls, NY (US); Casimer Maurice DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/976,546

(22) Filed: Oct. 12, 2001

(65) Prior Publication Data

US 2003/0072528 A1 Apr. 17, 2003

(51) Int. Cl.[7] ................................................ G02B 6/34
(52) U.S. Cl. ........................................ 385/37; 359/161
(58) Field of Search ............................. 385/24, 31, 37, 385/27, 43, 17, 124, 130, 147; 372/20, 29.01, 29.02, 32, 38.01, 38.07; 359/111, 124, 173, 161, 154

(56) References Cited

U.S. PATENT DOCUMENTS

| | | | |
|---|---|---|---|
| 6,353,623 B1 * | 3/2002 | Munks et al. | 359/161 |
| 6,400,868 B1 * | 6/2002 | Riant et al. | 385/37 |
| 6,417,956 B1 * | 7/2002 | Pedersen | 359/334 |
| 6,452,707 B1 * | 9/2002 | Puc et al. | 359/161 |
| 6,490,390 B1 * | 12/2002 | Wilcox | 385/27 |
| 2002/0008913 A1 * | 1/2002 | Yin et al. | 359/578 |
| 2003/0002113 A1 * | 1/2003 | Puc et al. | 359/161 |

OTHER PUBLICATIONS

"Introduction to DWDM Technology Data in a Rainbow", by Stamatios V. Kartalopoulos, Lucent Technologies, IEEE Communications Society, Sponsor, SPIE Optical Engineering Press, pp. 65–68.

"Introduction To DWDM Technology Data in a Rainbow", by Stamatios V. Kartalopoulos, Chapter 9, pp. 131–136.

"Distributed feedback semiconductor lasers", by John Carroll, et al., IEE Circuits, Devices and Systems Series 10, SPIE Press Monograph vol. PM52, 1998, pp. 7–15.

"Micromachining system accommodates large wafers", by Robert Bann, et al., Laser Focus World, The 2001 Annual Survey of the Laser Marketplace, PennWell, Jan. 2001, pp. 189–192.

* cited by examiner

Primary Examiner—Akm E. Uliah
(74) Attorney, Agent, or Firm—Scully, Scott, Murphy & Presser; Tiffany L. Townsend

(57) ABSTRACT

A system and method for precisely controlling the wavelength selective function provided by fiber Bragg gratings in optical fiber elements. The system and method exploits a wavelength-locked loop servo-control circuit and methodology that enables real time adjustment of the grating pattern being written to said fiber optical link element by a grating writing source to thereby mutually align a center wavelength of the peaked wavelength selective function resulting from the grating pattern with a center wavelength of the optical signal transmitted over a communication channel provided by the fiber. A real-time adaptive dispersion compensation technique for optical fibers is additionally provided that exploits the wavelength-locked loop servo-control circuit. In the adaptive compensation system, a tunable Bragg grating pattern is re-written to the fiber optical link element by a grating writing source under control of the wavelength-locked loop servo-control circuit in order to mutually align a center wavelength of the peaked wavelength selective function resulting from the grating pattern with a center wavelength of an optical signal to be transmitted over the channel.

30 Claims, 6 Drawing Sheets

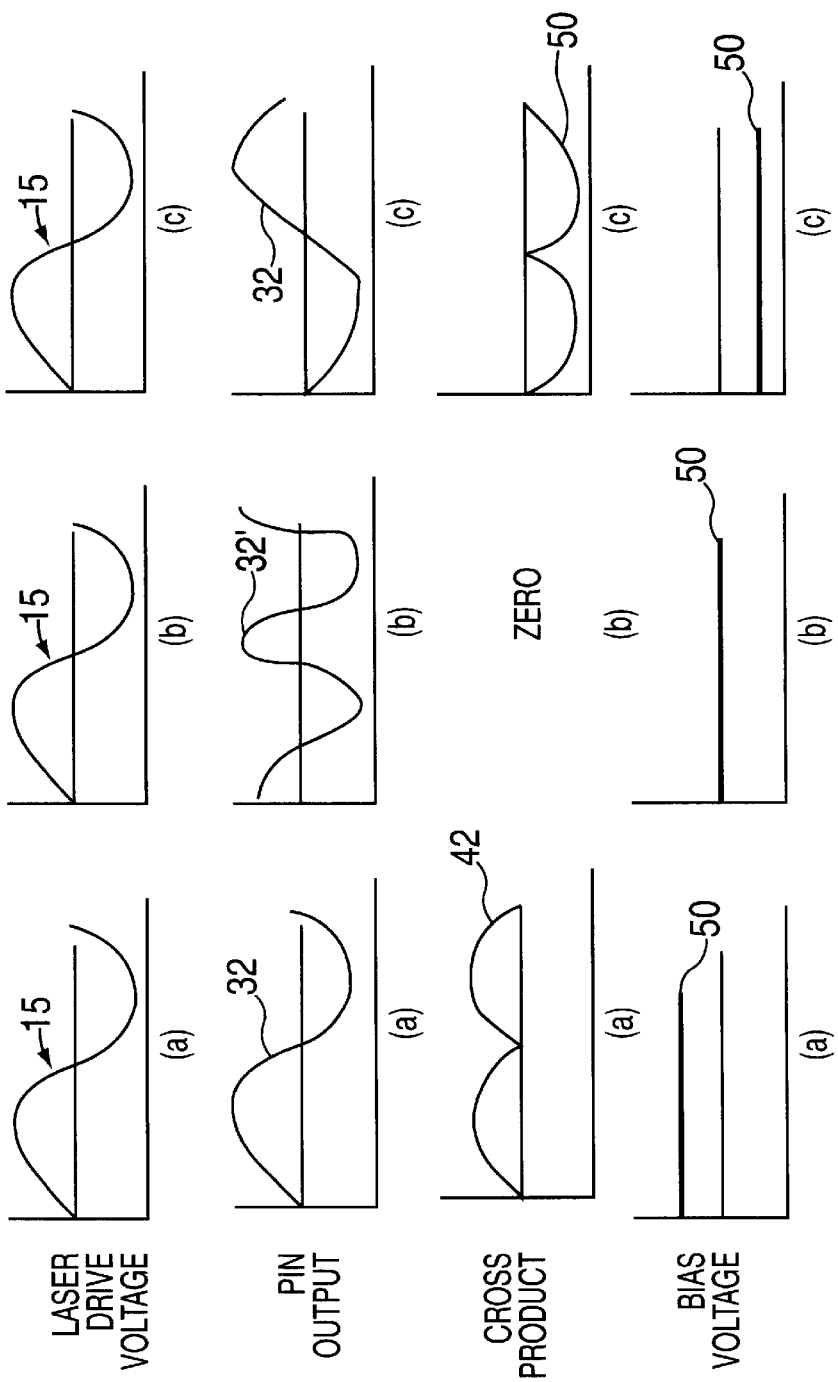

TUNABLE FIBER BRAGG GRATINGS AND WAVELENGTH-LOCKED LOOPS FOR DISPERSION COMPENSATION

BACKGROUND OF THE INVENTION

1. Field of the Invention

The present invention relates generally to optical devices such as lasers, and fiber optic data transmission systems employing the same, and particularly to a novel wavelength-locked loop servo-control circuit applied for writing control of Bragg gratings implemented in fiber optical links.

2. Description of the Prior Art

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 nm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

As known, one optical network system element includes a Bragg grating which is a short section of optical fiber that has been slightly modified.

Particularly, as illustrated in FIG. 1, in a portion 100 of optic fiber implementing a Bragg grating comprises cladding layers 110, 111 and, a core 112 forming an optical cavity having the fibre gratings 115. To form the gratings, the optical fiber core 112 at that portion 100 is exposed to ultraviolet radiation in a regular pattern, which results in the refractive index 119 of the fiber core to be altered according to that regular pattern. If the fiber is then heated or annealed for a few hours, the index changes become permanent. As described in K. Hill, Fiber Bragg Gratings, Chapter 9 in Handbook of Optics vol. IV, OSA Press (2000) and, B. Poumellec, P. Niay, M. Douay et al., "The UV induced Refractive Index Grating in Ge:SiO2 Preforms: Additional CW experiments and the macroscopic origins of the change in index", Journal Of Physics D, App. Phys. Vol. 29, p. 1842–1856 (1996), the contents and disclosures of which are incorporated by reference herein, this phenomena is known as "photosensitivity." It is understood that the magnitude of the index change may depend upon many factors including: the irradiation wavelength, intensity, and total dose, the composition and doping of the fiber core, and any materials processing done either prior or subsequent to irradiation. For example, in germanium-doped singlemode fibers, index differences between $10^{-3}$ and $10^{-5}$ are achievable. Using this effect, periodic diffraction gratings can be written in the core of an optical fiber. Typically, the exposure is carried out using an interferometer or, through a phase mask with a periodic structure that permits writing of a periodically varying refractive index grating within the photorefractive media within the core. The reflectivity, bandwidth and central wavelength of such a Bragg structure are generally defined by the period and length of the phase mask and exposure time used.

Light traveling through these refractive index changes of optical fiber core having a fibre Bragg grating is reflected back, with a maximum reflection usually occurring at one particular wavelength known as the "Bragg wavelength". That is, such gratings reflect light in a narrow bandwidth centered around the Bragg wavelength, $\lambda_B$, according to the following equation:

$$\lambda_B = 2 N_{\mathit{eff}}$$

where $\Lambda$ is the spatial period, or pitch, of the periodic index variations and $N_{\mathit{eff}}$ is the effective refractive index for light propagating in the fiber core. Thus, the wavelength of light reflected back depends on the amount of refractive index change that has been applied and also on how distantly spaced the refractive index changes 119 are. If the spacing of the Bragg planes is varied across the length of the grating, it is possible to produce a chirped grating, in which different wavelengths can be considered to be reflected from different points along the grating.

These in-fiber Bragg gratings written with photorefractive interference techniques have become an important part of modern fiber optic data communication systems. Such gratings have been employed in many systems, and are especially attractive for dense wavelength multiplexing (DWDM) where they can serve as in-line filters. In this capacity, the fiber Bragg grating functions as a wavelength-selective optical filter.

As the grating is produced by direct optical writing in a photorefractive fiber media, it is often difficult to control the alignment between the grating period (wavelength responsivity) and the center wavelengths of the DWDM communication channels. This mismatch can result in excessive optical loss and poor link performance.

It would be highly desirable to provide a system and methodology that ensures wavelength alignment between the filter bandpass with the center wavelength of the DWDM channel by monitoring the transmission properties of the grating as it is formed in the optical fiber.

It would be further highly desirable to provide a system and methodology for forming a Bragg grating in a length of optical fiber that employs a feedback loop for adjusting the writing laser as required to optimize the grating properties of the optical fiber in the grate writing process.

As known, fibre Bragg gratings may additionally be implemented as narrowband retroreflectors for providing feedback at a specific wavelength in fibre lasers (both in short pulse and single frequency lasers); filters for multi-channel wavelength-division multiplexed (WDM) communications systems; and, fibre dispersion compensators in fibre links, or spectral manipulators of optical pulses as in a chirped pulse amplification (CPA) system. Fiber dispersion is a phenomena that causes optical pulses to spread as they propagate through fibers, eventually causing intersymbol interference and bit errors. It is important that effective compensation techniques be provided as dispersion is a fundamental limitation on the maximum data rate in a fiber optic communication systems. Fiber Bragg gratings applied for dispersion compensation may be re-written in real time using various schemes including: photorefractive or photocehemically induced schemes, or electrorefractive schemes. One company, Southampton Photonics, Inc., produces electrically Fiber Bragg Grating filter devices (http://www.southamptonphotonics.com). Digilens Inc. (http://www.digilens.com/) has developed electrically-switchable Bragg gratings (S-bugs™) in liquid crystals rather than solid substrates such as silica and silicon. As the characteristics of the liquid crystal can be modified by applying an electric current, Digilens Bragg grating devices may split off a specific wavelength and then adjust its power or switch it in a single operation. This may significantly increase the unrepeated link distance and improve the bit error rate for channels running at 1 to 10 Gbit/s or beyond. Further, tunable fiber Bragg gratings provide the means to change the grating period in response to external optical signals.

It would be further highly desirable to provide an improved tunable Bragg grating technology that incorporates a novel feedback control loop that would permit the automatic adjustment of the grating properties over time and as a function of optical power and wavelength, effectively allowing the control loop to correct for all wavelength dependent absorption or dispersion properties of an DWDM fiber link.

SUMMARY OF THE INVENTION

It is therefore an object of the present invention to provide a system and method for manufacturing a Fibre Bragg grating within an optical fiber employed in a WDM/DWDM communication system that enables reduction of the loss caused by mismatch of the alignment between the grating period (wavelength responsivity) and the center wavelengths of the WDM and DWDM communication channels.

It is another object of the present invention to provide a system and method that ensures wavelength alignment between the filter bandpass with the center wavelength of the DWDM channel by monitoring the transmission properties of the grating as it is formed in the optical fiber.

It is a further object of the present invention to provide a system and method for forming a Bragg grating in a length of optical fiber that employs a servo/feedback loop, referred to as a "wavelength-locked loop," that enables dynamic adjustment of the writing laser as required to optimize the grating properties of the optical fiber during the grate writing process.

It is yet a further object of the present invention to provide an active dispersion compensation system for an optical network that enables re-writing, in real time, of the fiber Bragg gratings applied for wavelength dispersion compensation in fiber optic links using various optical schemes. Advantageously, this active dispersion compensation system may significantly increase the unrepeated link distance and improve the bit error rate for channels running at 1 to 10 Gbit/s or beyond.

It is still a further object of the present invention to provide a system and method for providing an improved tunable Bragg grating technology that incorporates a novel servo/feedback loop, referred to as a "wavelength-locked loop," that permits the automatic adjustment of the grating properties over time and as a function of optical lower and wavelength, thereby effectively allowing the servo/feedback loop to correct for all wavelength dependent absorption or dispersion properties of an WDM/DWDM fiber link, thereby enabling significantly larger link power budgets and longer supported distances.

It is yet still another object of the present invention to provide a servo/feedback loop, referred to as a "wavelength-locked loop," that provides compensation for wavelength dispersion effects while writing a fiber Bragg grating and enables control of the properties of the writing laser (intensity, wavelength, modulation period, etc.) so that the resulting grating will have a desired optical transfer function.

Thus, according to one aspect of the invention, there is provided a system and method for writing a Bragg grating pattern to an optical fiber providing a communication channel for an optical network, the method comprising: providing an optical signal capable of being communicated via a fiber optic link element providing said communication channel, the optical signal characterized as having an operating center wavelength associated with the channel; writing a grating pattern on a portion of the optical fiber link, the grating pattern providing a peaked wavelength selective function including a center wavelength; and providing real-time adjustment of the grating pattern being written to the fiber optical link element by the source to thereby mutually align the center wavelength of the peaked wavelength selective function resulting from the grating with the center wavelength of the optical signal, wherein the resulting grating writing pattern enables optical signals to be optimally communicated over the communication channel.

According to another aspect of the invention, there is provided a system and method for adaptively compensating for dispersion effects in optical fiber elements, the optical fiber element having formed therein a tunable Bragg grating pattern providing a peaked wavelength selective function including a center wavelength, the method comprising the steps of: providing an optical signal capable of being communicated via a fiber optic link element providing a communication channel, the optical signal characterized as having an operating center wavelength associated with the channel; providing a grating writing source for re-writing the Bragg grating pattern on a portion of the optical fiber link; and, enabling real-time adjustment of the grating pattern being re-written to the fiber optical link element by the source to thereby mutually align the center wavelength of the peaked wavelength selective function resulting from the grating with the center wavelength of the optical signal, the resulting re-written grating pattern eliminating dispersion compensation effects of the communication channel.

When implemented for writing Bragg grating patterns in optical fiber links or as an aid for reducing dispersion effects in optical fiber links, a wavelength-locked loop servo-control circuit is implemented that comprises: a mechanism for applying a dither modulation signal at a dither modulation frequency to an optical signal to be communicated over the channel, and transmitting the dither modulated optical signal through the optical fiber link during writing (or re-writing) of the grating pattern; a mechanism for converting a portion of the dither modulated signal output from the optical fiber link portion into an electric feedback signal; a mechanism for continuously comparing the feedback signal with the dither modulation signal and generating an error signal representing a difference between a frequency characteristic of the feedback signal and a dither modulation frequency; wherein a grating (re-)writing source is responsive to the error signal for automatically adjusting a grating spacing formed in the optical fiber link according to the error signal, wherein the center wavelength of the optical signal and the center wavelength of the wavelength selective function resulting from the formed grating pattern become aligned when the frequency characteristic of the feedback signal is two times the dither modulation frequency.

Advantageously, the system and method of the present invention may be employed in many applications utilizing fiber Bragg gratings, including but not limited to: optical communications and optical sensors, such as tapped optical delay lines, filters, multiplexers, optical strain gauges, and others; and further, is especially advantageous for implementation in WDM and DWDM optical systems.

BRIEF DESCRIPTION OF THE DRAWINGS

Further features, aspects and advantages of the apparatus and methods of the present invention will become better understood with regard to the following description, appended claims, and the accompanying drawings where:

FIGS. 3(a)–3(c) are signal waveform diagrams depicting the relationship between laser optical power as a function of wavelength for three instances of optic laser signals;

FIGS. 4(a)–4(c) are signal waveform diagrams depicting the laser diode drive voltage dither modulation (a sinusoid) for each of the three waveform diagrams of FIGS. 3(a)–3(c);

FIGS. 5(a)–5(c) are signal waveform diagrams depicting the resulting feedback error signal output of the PIN diode for each of the three waveform diagrams of FIGS. 3(a)–3(c);

FIGS. 6(a)–6(c) are signal waveform diagrams depicting the cross product signal resulting from the mixing of the amplified feedback error with the original dither sinusoid;

FIGS. 7(a)–7(c) are signal waveform diagrams depicting the rectified output laser bias voltage signals which are fed back to adjust the laser current and center frequency;

DETAILED DESCRIPTION OF PREFERRED EMBODIMENTS

The present invention is directed to techniques for the manufacture, i.e., writing, of fiber optic (Bragg) gratings in optical fibers utilized in a variety of applications, including but not limited to: WDM/DWDM optical communication system, optical sensors, such as tapped optical delay lines, filters, multiplexers, optical strain gauges, and others. Furthermore, an active wavelength dispersion compensation technique is provided that enables re-writing of existing fiber Bragg gratings applied for wavelength dispersion compensation in fiber optic links using various optical techniques. In each embodiment, as will be particularly described with respect to FIGS. 8 and 9, a novel servo-control loop is employed that enables dynamic adjustment of the writing laser as required to optimize the grating properties of the optical fiber during the grate writing process and in real-time operation for dispersion compensation while re-writing Bragg gratings.

Figure 2A:
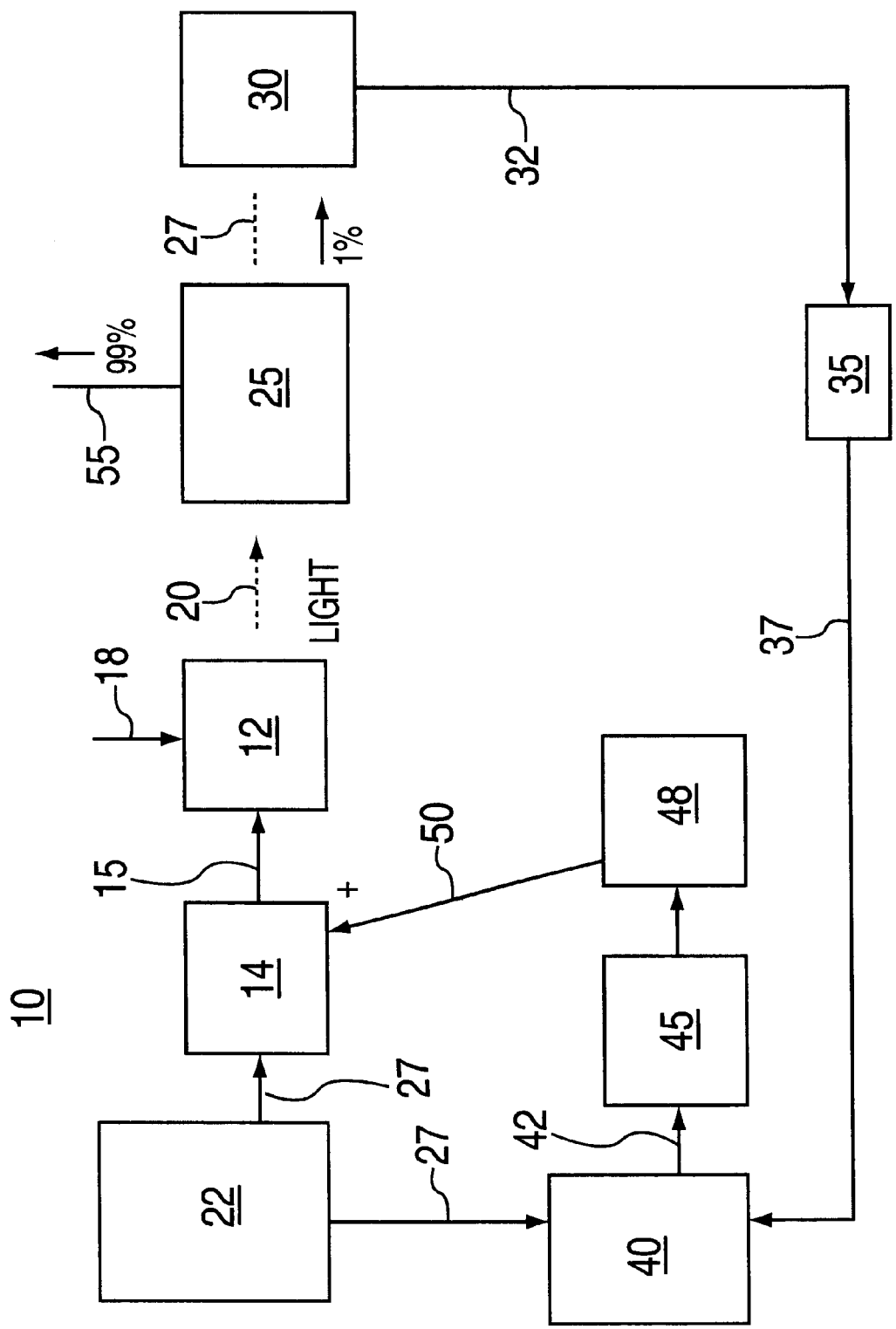
FIGS. 2(a) and 2(b) depict examples of underlying wavelength-locked loop system architectures.

As shown in FIG. 2(a), the novel servo-control system implements a principle referred to herein as the "wavelength-locked loop" or "lambda-locked loop" (since the symbol lambda is commonly used to denote wavelength). The basic operating principle of the wavelength-locked loop (WLL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Particularly, as described in commonly-owned, co-pending U.S. patent application Ser. No. 09/865,256, and with reference to FIG. 2(a), the wavelength-locked loop principle implements a dither modulation to continuously adjust an electromagnetic signal source characterized as having a peaked frequency spectrum or peaked center wavelength, e.g., a laser light source, so as to track the center of a frequency selective device, e.g. a filter passband. In this manner, optimal power of the signal is transmitted and optimal use is made of the system transmission bandwidth. The principle may be exploited for tuning any light source having a peaked frequency spectrum, and additionally, may be used to tune or adjust transmission properties of frequency selective devices such as tunable filters.

For purposes of description, the basic operating principle of the WLL is shown in FIG. 2(a) which depicts an example optic system 10 including a light source such as laser diode 12 driven with both a bias voltage 15 from a voltage bias circuit 14, and modulated data 18 from a data source (not shown). The laser diode generates an optical (laser light) signal 20 that is received by a bandpass filter 25 or, any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass. As further shown in FIG. 2(a), according to the invention, there is an added sinusoidal dither modulation circuit or oscillator 22 for generating a sinusoidal dither modulation signal 27 that modulates the laser bias voltage. The sinusoidal dither signal may be electronically produced, e.g., by varying the current for a laser, or mechanically, by varying the micro-electromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the laser diode bias current 15 in this manner causes a corresponding dither in the laser center wavelength. Modulated data is then imposed on the laser, and the optical output passes through the bandpass filter 25. Preferably, the filter 25 is designed to tap off a small amount of light 29, for example, which is incident upon a photo detector receiver device, e.g., P-I-N diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 35. The cross product signal 42 that results from the multiplication of the amplified PIN diode output (feedback signal) 37 and the dither signal 35 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the laser bias voltage device 15 where it may be added (e.g., by an adder device, not shown) in order to correct the laser bias current 15 in the appropriate direction. In this manner, the bias current (and laser wavelength) will increase or decrease until it exactly matches the center of the filter passband. Alternately, the error signal 50 may be first converted to a digital form, prior to input to the bias voltage device.

Figure 2B:
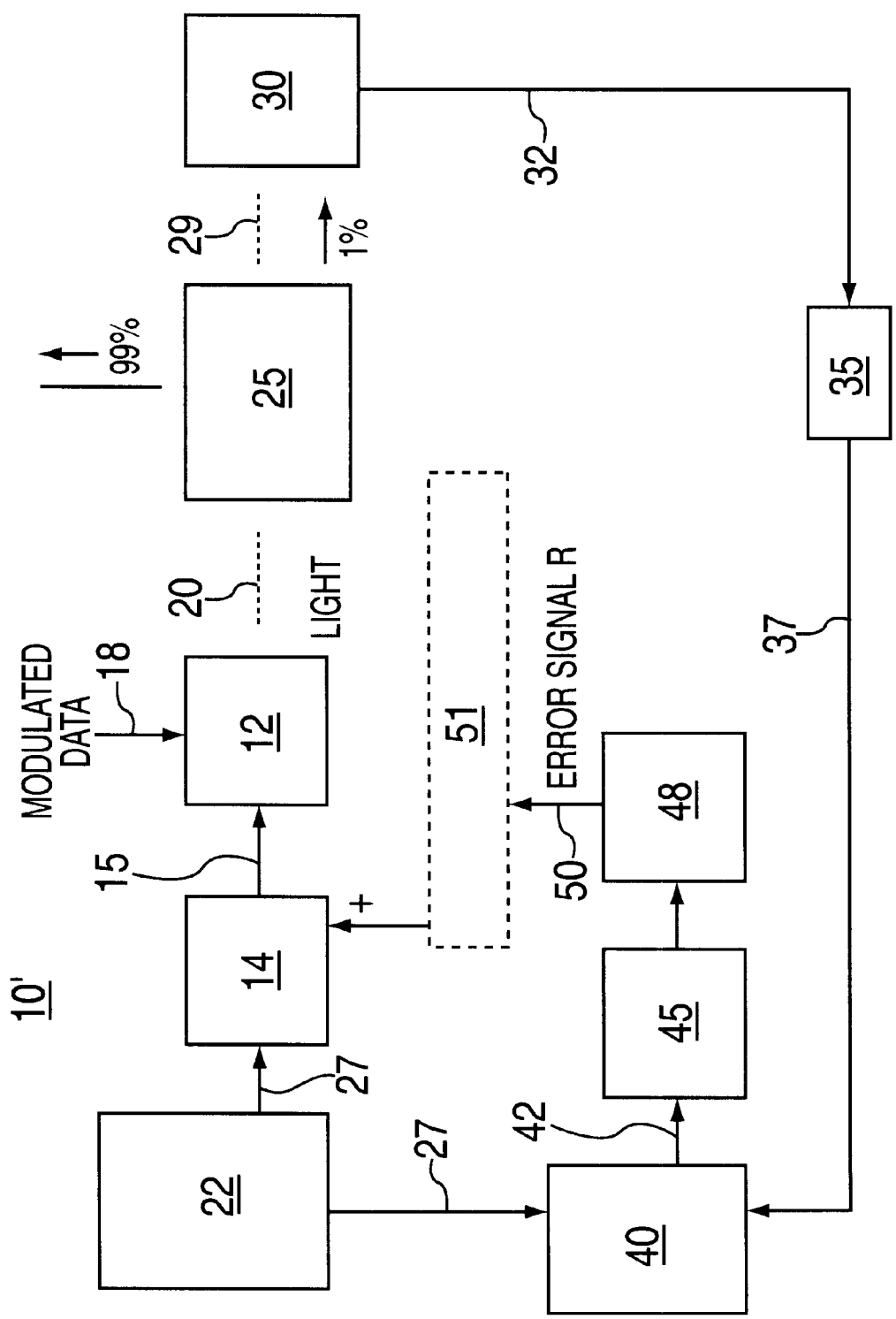

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in FIG. 2(b) which is a system 10' corresponding to the system 10 of FIG. 2(a), there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 2C:
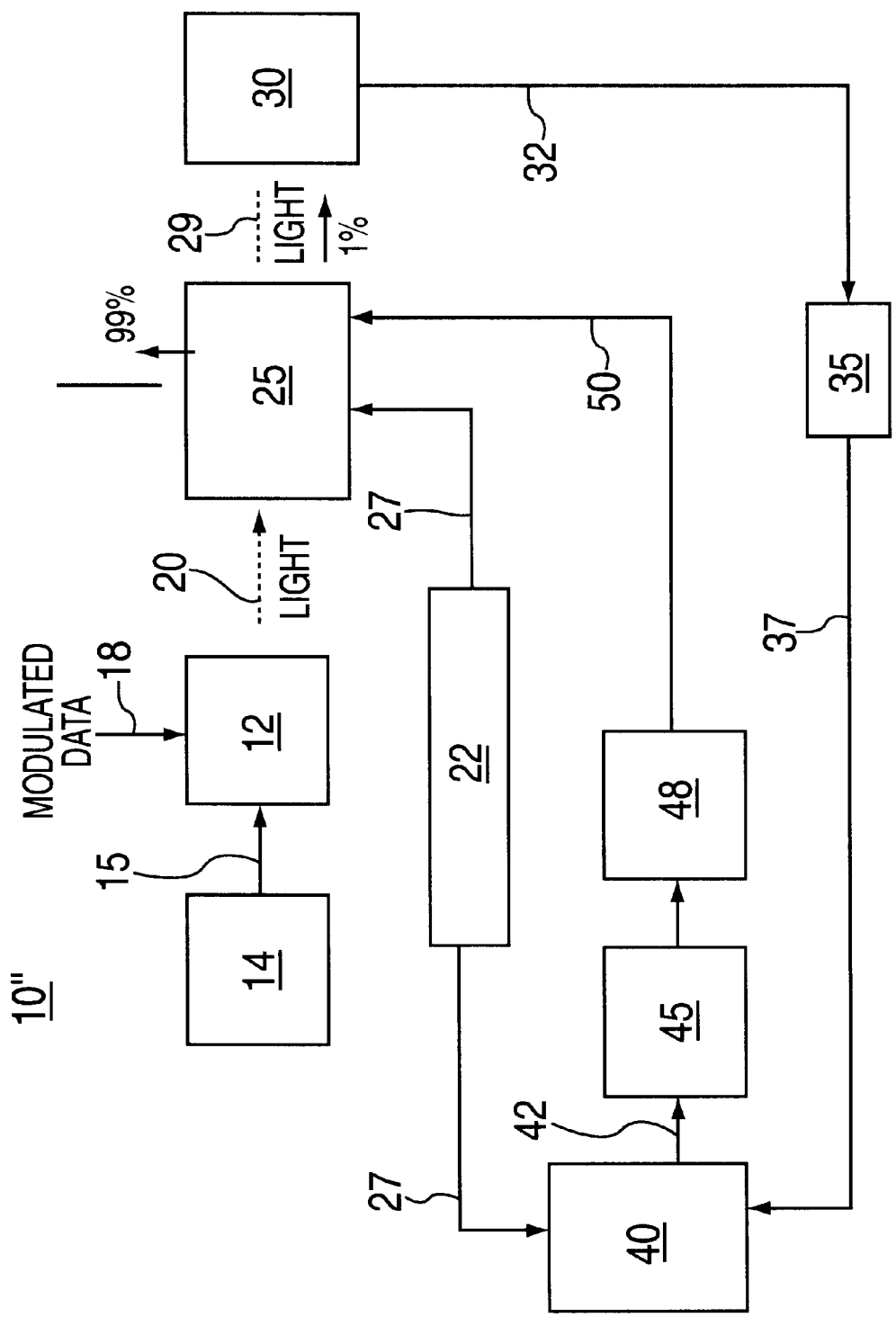
FIG. 2(c) is a general block diagram depicting the underlying system architecture for tuning tunable frequency selective devices such as a bandpass filter according to the principles of the present invention.

It should be understood that, as described in commonly-owned, co-pending U.S. patent application Ser. No. 09/865,256, the WLL servo-control system may be implemented for tuning tunable frequency selective devices such as a bandpass filter for a variety of optical network applications, including optical gain control circuits, such as provided in the present invention. Thus, in the embodiment depicted in FIG. 2(c), the system 10" comprises similar elements as system 10 (of FIG. 2(a)) including a bias voltage generator device 14 for applying a bias signal 15 to the laser diode 12 for generating an optical signal 20 having a peaked spectrum function. This signal 20 is input to a tunable frequency selective device 25, e.g., a tunable bandpass filter. As shown in FIG. 2(c), however, the sinusoidal dither/driver device 22 is implemented for modulating the peak center frequency of filter pass band with a small dither signal 27. A small amount of light 29 is tapped off the output of the filter 25 for input to the photodetector device, e.g., PIN diode 30, where the optical signal is converted to electrical signal 32, amplified by amplifier device 35, and input to the mixer device 40 which additionally receives the dither signal 27. The mixer device generates the vector cross product 42 of the amplified feedback signal 37 with the dither signal 27 and that result is low-pass filtered, and smoothed (e.g., integrated) by integrator device 48 to provide error signal 50, in the manner as will be discussed herein with reference to FIGS. 3–7. This error signal 50 may be a bi-polar signal and may be used to dynamically adjust the peak center frequency of the filter passband until it matches the center frequency of the laser signal input 20.

The operating principle of the WLL is further illustrated in the timing and signal diagrams of FIGS. 3–7. FIGS. 3(a)–3(c) particularly depicts the relationship between laser optical power as a function of wavelength for three instances of optic laser signals: a first instance (FIG. 3(a)) where the laser signal frequency center point 21 is less than the bandpass function centerpoint as indicated by the filter bandpass function 60 having centerpoint 62 as shown superimposed in the figures; a second instance (FIG. 3(b)) where the laser frequency center point 21 is aligned with the bandpass function centerpoint 62; and, a third instance (FIG. 3(c)) where the laser frequency center point 21 is greater than the bandpass function centerpoint 62. In each instance, as depicted in corresponding FIGS. 4(a)–4(c), the laser diode drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 3(a) and 3(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 5(a) and 5(c). It is noted that for the laser signals at frequencies below the peak (FIG. 3(a)) the feedback error signal 32 corresponds in frequency and phase to the dither signal (FIG. 5(a)), however for the laser signals at frequencies above the peak (FIG. 3(c)) the feedback error signal 32 corresponds in frequency but is 180° opposite phase of the dither signal (FIG. 5(c)). Due to the bipolar nature of the feedback signal (error signal) for cases when the laser signal centerpoint is misaligned with the bandpass filter centerpoint, it is thus known in what direction to drive the laser diode (magnitude and direction), which phenomena may be exploited in many different applications. For the laser signal depicted in FIG. 3(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 5(b) showing an feedback error signal at twice the frequency of the dither frequency.

Thus, in each instance, as depicted in corresponding FIG. 5(b), the resulting feedback signal exhibits frequency doubling if the laser center wavelength is aligned with the filter center wavelength; otherwise it generates a signal with the same dither frequency, which is either in phase (FIG. 5(a)) or out of phase (FIG. 5(c)) with the original dither modulation. It should be understood that, for the case where there the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling laser at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Referring now to FIGS. 6(a) and 6(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 6(a) or, at a second polarity (for the laser signals at frequencies above the bandpass filter centerpoint), such as shown in FIG. 6(c). Each of these signals may be rectified and converted into a digital output laser bias voltage signal 48 as shown in respective FIGS. 7(a) and 7(c), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 7(b)) which will maintain the laser frequency centerpoint at its current wavelength value.

Figure 1:
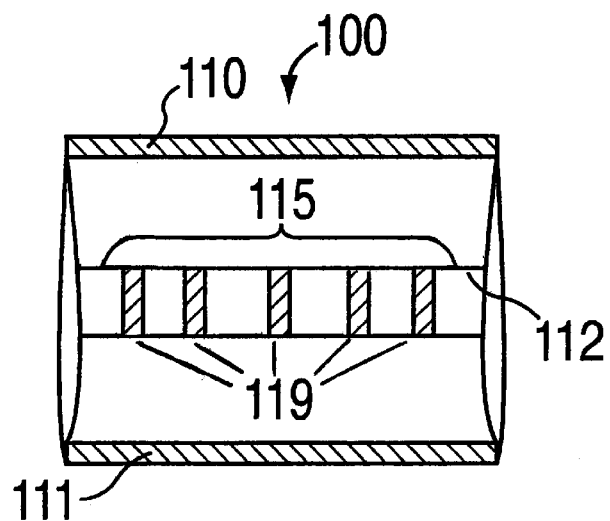
FIG. 1 is a block diagram illustrating the concept of a Bragg grating implemented in the core of the fiber link.
Figure 8:
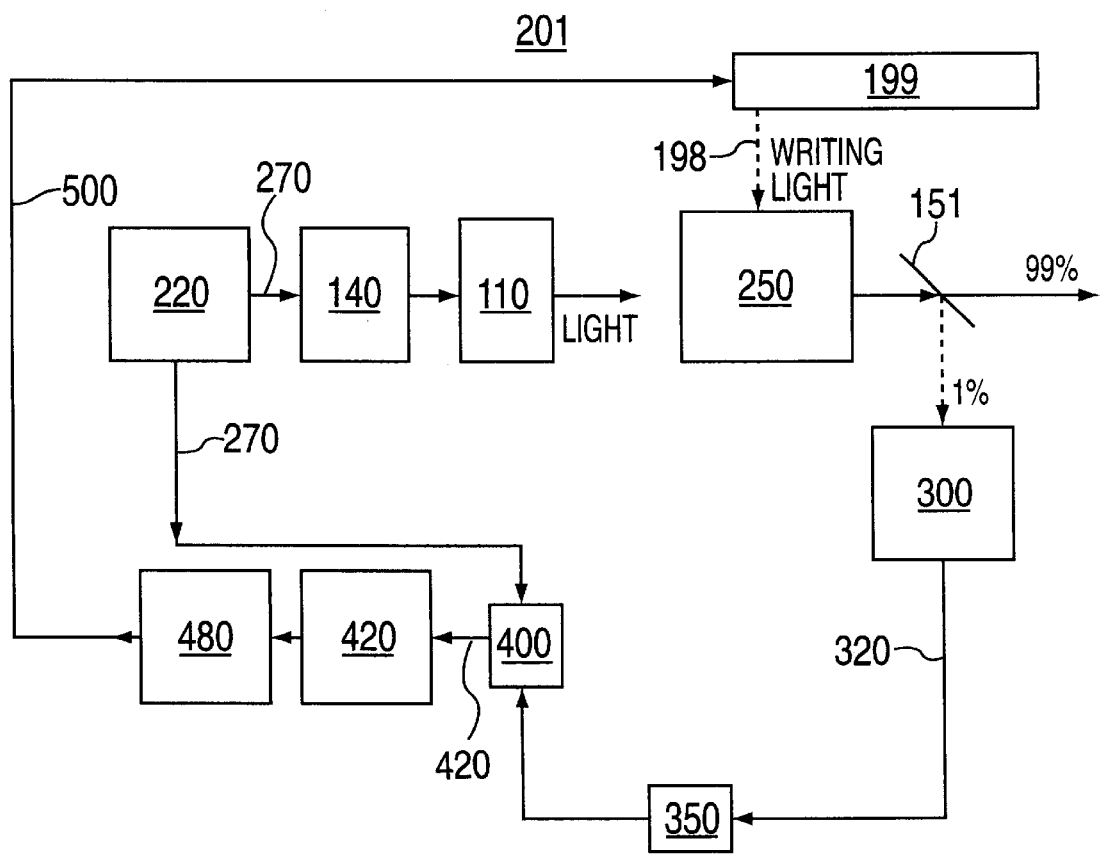
FIGS. 8 illustrates a fibre Bragg grating writing system 201 implementing the wavelength-locked loop according to the principles of the invention.

The use of a wavelength locked loop to compensate for wavelength dispersion effects while writing a fiber Bragg grating to a length of optical fiber according to a first embodiment is shown in the FIG. 8. As shown in FIG. 8, the WLL is employed to actively align the filter bandpass resulting from the grating, with the center wavelength of the optical channel, assumed to be a DWDM channel. That is, the WLL makes it possible to monitor the transmission properties of the grating as it is formed in the optical fiber portion 250 and to adjust the writing laser as required to optimize the grating properties.

As shown in FIG. 8, there is depicted a fibre Bragg grating writing system 201 including a grating writing source 199 including a coherent light source such as a high power laser 198, or, may include an interferometer or phase mask with a periodic structure for exposing ultraviolet radiation in a regular pattern to a portion of optical fiber 250. The grating writing system implementing the WLL principle employs a dither signal generator 220 provides a dither oscillation signal 270 that is input to a bias voltage control circuit 140 that enables dither modulation of the optical signal 160 output from an optical signal generator 110, e.g., a laser diode device. Thus, the nominal center wavelength of the laser signal 160 is dithered by a low frequency (kHz or less) dither oscillator source driving the semiconductor laser's bias voltage. The light 160 passing through the portion of optical fiber 250 in which the Fibre Bragg grating pattern is being formed, is thus intensity modulated at a low frequency. A portion of this light, e.g., 1%, is tapped off using an optical splitter or coupler device 151 and diverted to a photodetector device 300, e.g., a P-I-N diode, which converts the tapped optical signal into an electrical feedback signal 320 that is proportional to the intensity modulation of the light. It is understood that the amount of light that may be tapped off may range anywhere between one percent (1%) to five percent (5%) of the optical output signal, however, skilled artisans will appreciate any amount of laser light above the noise level that retains the integrity of the output signal including the dither modulation characteristic, may be tapped off (i.e., less than 1%). This signal 320 feeds back to an electronic circuit including an amplifier 350 which amplifies the signal, and a mixer device 400, which multiplies it with the original dither oscillator signal 270 to produce their vector cross product. The resulting signal 420 is then filtered, integrated and digitized by integrator device 480 which results in a control signal 500 that is zero value if the laser signal center wavelength and Bragg wavelength are properly aligned (the cross product is frequency doubled, which averages out to zero when passing through the electronics). If, according to the WLL principles, the laser and Bragg grating center frequency are not aligned, the signal 500 provides both the amount by which the grating writing source laser must be adjusted to realign them and the direction (increase or decrease) in which the wavelength of the grating writing source laser is to move in order to result in the proper adjustment of the grating. For example, it would be within the purview of skilled artisans to enable adjustment of the grating writing source according to the error signal 500 to achieve the desired interferogram or hologram (i.e., interference pattern used in the generation of the grating pattern to be written) that will achieve the spectral matching of the optical signal 160 and optical fiber.

Figure 9:
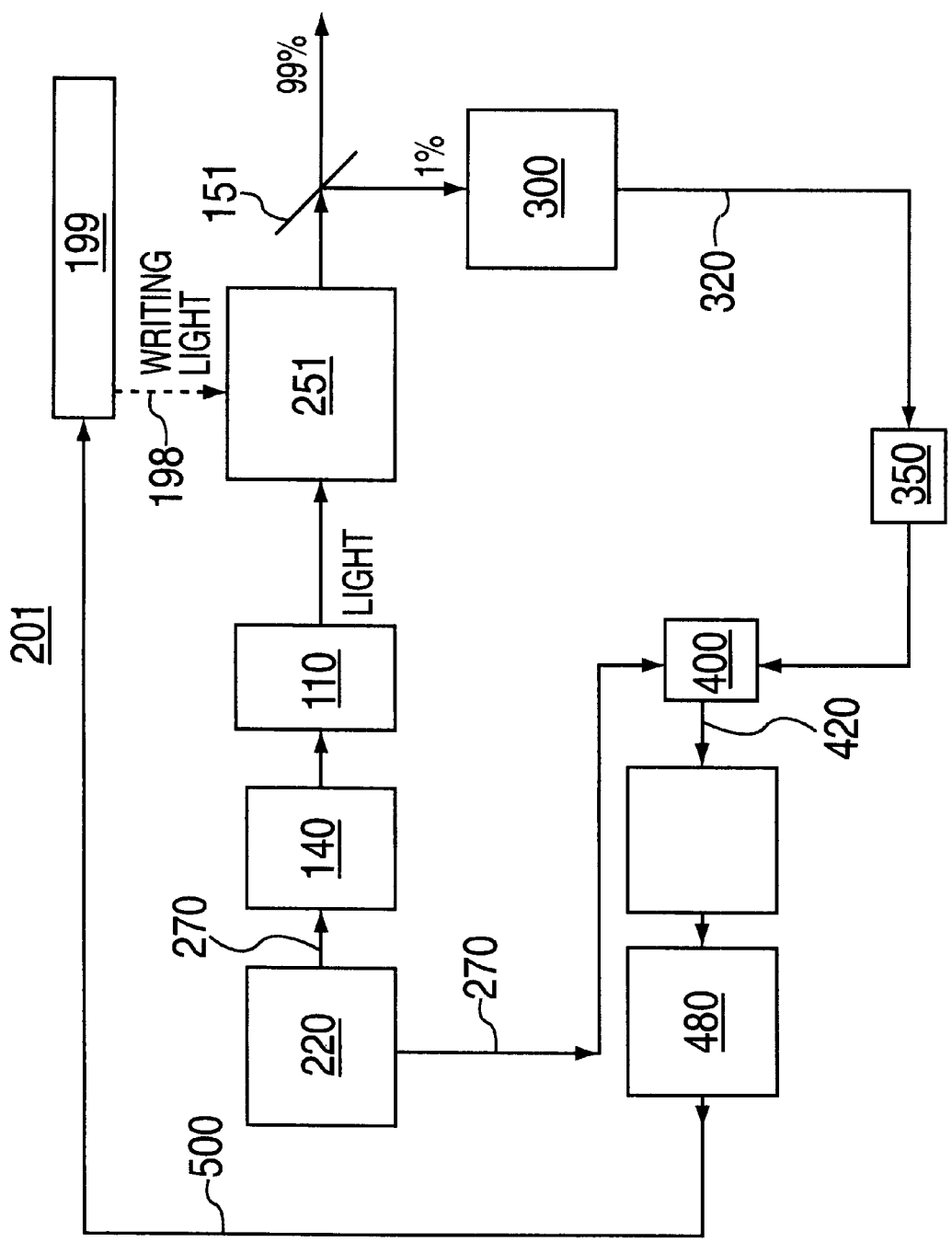
FIGS. 9 is a block diagram depiction of an adaptive dispersion compensation system implementing the wavelength-locked loop according to the principles of the invention.

In an alternate embodiment, depicted in FIG. 9, it is assumed that the optical fiber includes a tunable Bragg grating. Thus, as shown in FIG. 9, there is depicted a fibre Bragg grating writing system 201 including a grating writing source 199 such as a high power laser, interferometer or phase mask with a periodic structure for tuning an existing Bragg grating structure already formed in a portion of optical fiber 251. As in the system of FIG. 8, the grating writing system implementing the WLL principle employs a dither signal generator 220 provides a dither oscillation signal 270 that is input to a bias voltage control circuit 140 that enables dither modulation of the optical signal 160 output from an optical signal generator 110, e.g., a laser diode device. Thus, the nominal center wavelength of the laser signal 160 is dithered by a low frequency (kHz or less) dither oscillator source driving the semiconductor laser's bias voltage. The light 160 passing through the portion of optical fiber 250 which includes the Fibre Bragg grating pattern is thus intensity modulated at a low frequency. A portion of this light, e.g., 1%, is tapped off using an optical splitter or coupler device 151 and diverted to a photodetector device 300, e.g., a P-I-N diode, which converts the tapped optical signal into an electrical feedback signal 320 that is proportional to the intensity modulation of the light. It is understood that the amount of light that may be tapped off may range anywhere between one percent (1%) to five percent (5%) of the optical output signal, however, skilled artisans will appreciate any amount of laser light above the noise level that retains the integrity of the output signal including the dither modulation characteristic, may be tapped off (i.e., less than 1%). This signal 320 feeds back to an electronic circuit including an amplifier 350 which amplifies the signal, and a mixer device 400, which mixes it with the original dither oscillator signal 270 to produce their vector cross product. The resulting signal 420 is then filtered, integrated and digitized by integrator device 480 which results in a control signal 500 that is zero value if the laser signal center wavelength and Bragg wavelength are properly aligned (the cross product is frequency doubled, which averages out to zero when passing through the electronics). If, according to the WLL principles, the laser and Bragg grating center frequency are not aligned, the signal 500 provides both the amount by which the grating writing source laser or grating pattern periodicity must be adjusted to realign them and the direction (increase or decrease) in which the wavelength of the grating writing source signal is to move. For example, error signal 500 may be a positive or negative value which is used to adjust the writing source 199 according to whether the grating spacing is to be respectively increased (e.g., resulting in a decreased center wavelength of said peaked wavelength selective function) or, whether the grating spacing is to be decreased (resulting in an increased center wavelength of said peaked wavelength selective function) in order to achieve the spectral matching of the optical signal 160 and optical fiber.

According to an embodiment of the invention, a wavelength locked loop is implemented in which the optical wavelength is fixed but the grating period dithers about a central periodicity at a low frequency. The result is a signed error signal which indicates both the amount and direction in which the Bragg grating period is misaligned with the center wavelength of the DWDM channel being added or dropped (note that this also increases isolation between adjacent DWDM channels in the add/drop multiplexer, and, due to the better isolation and channel separation achieved, enables construction of adaptive, self-correcting add/drop stages regardless of the number of wavelengths in use or the spectral power density).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A Bragg grating writing system for optical networks comprising:

an optical signal generator for providing an optical signal capable of being communicated via a fiber optic link element providing a communication channel, said optical signal characterized as having an operating center wavelength associated with said channel;

a grating writing source for writing a grating pattern on a portion of said optical fiber link, said grating pattern providing a peaked wavelength selective function including a center wavelength;

a wavelength-locked loop servo-control circuit enabling real-time adjustment of said grating pattern being written to said fiber optical link element by said source to thereby mutually align said center wavelength of said peaked wavelength selective function resulting from said grating with said center wavelength of said optical signal, wherein the resulting grating writing pattern enables optical signals to be optimally communicated over said communication channel.

2. The Bragg grating writing system as claimed in claim 1, wherein said wavelength-locked loop servo-control circuit comprises:

mechanism for applying a dither modulation signal at a dither modulation frequency to said optical signal, and transmitting said dither modulated optical signal through said optical fiber link portion during writing of said grating pattern;

mechanism for converting a portion of said dither modulated signal output from said optical fiber link portion into an electric feedback signal;

mechanism for continuously comparing said feedback signal with said dither modulation signal and generating an error signal representing a difference between a frequency characteristic of said feedback signal and a dither modulation frequency; and wherein said grating writing source is responsive to said error signal for automatically adjusting a grating spacing formed in said optical fiber according to said error signal, said center wavelength of said optical signal and said center wavelength of said wavelength selective function resulting from said grating pattern becoming aligned when said frequency characteristic of said feedback signal is two times said dither modulation frequency.

3. The Bragg grating writing system as claimed in claim 1, wherein said optical signal is a laser signal, said optical signal generator comprising:

a laser diode device for generating a laser signal; and, a laser bias voltage circuit for providing a bias voltage to said laser diode device for generating said laser signal.

4. The Bragg grating writing system as claimed in claim 2, wherein said device for applying a dither modulation to said bias signal is a sinusoidal dither circuit for generating a sinusoidal dither modulation signal of a predetermined frequency.

5. The Bragg grating writing system as claimed in claim 1, wherein said converting mechanism is a photodetector device.

6. The Bragg grating writing system as claimed in claim 5, wherein said photodetector device is a p-i-n diode.

7. The Bragg grating writing system as claimed in claim 4, wherein said device for comparing includes a mixer capable of combining said converted feedback signal with said sinusoidal dither modulation signal and generating a cross-product signal having components representing a sum and difference at dither frequencies.

8. The Bragg grating writing system as claimed in claim 7, further including:

low-pass filter device for filtering said output cross-product signal; and integrator circuit for averaging said output cross-product signal to generate said error signal, whereby said error signal is positive or negative depending on whether a grating spacing is to be respectively increased for decreasing a center wavelength of said peaked wavelength selective function resulting from said grating or, whether a grating spacing is to be decreased for increasing a center wavelength of said peaked wavelength selective function resulting from said grating.

9. The Bragg grating writing system as claimed in claim 1, wherein said optical fiber is a germanium-doped fiber.

10. The Bragg grating writing system as claimed in claim 1, wherein said grating writing source includes an interferometer.

11. The Bragg grating writing system as claimed in claim 1, wherein said grating writing source includes a phase mask and ultraviolet light source.

12. The Bragg grating writing system as claimed in claim 1, wherein said grating writing source includes a laser signal source.

13. An adaptive dispersion compensation system for optical networks comprising:

an optical signal generator for providing an optical signal capable of being communicated via a fiber optic link element providing a communication channel, said optical signal characterized as having an operating center wavelength associated with said channel;

a tunable Bragg grating pattern formed in said fiber optic link element, said grating pattern providing a peaked wavelength selective function including a center wavelength;

a grating writing source for re-writing said Bragg grating pattern on a portion of said optical fiber link;

a wavelength-locked loop servo-control circuit enabling real-time adjustment of said grating pattern being re-written to said fiber optical link element by said source to thereby mutually align said center wavelength of said peaked wavelength selective function resulting from said grating with said center wavelength of said optical signal, the resulting re-written grating pattern eliminating dispersion compensation effects of said communication channel.

14. The adaptive dispersion compensation system as claimed in claim 13, wherein said wavelength-locked loop servo-control circuit comprises:

mechanism for applying a dither modulation signal at a dither modulation frequency to said optical signal, and transmitting said dither modulated optical signal through said optical fiber link portion during re-writing of said grating pattern;

mechanism for converting a portion of said dither modulated signal output from said optical fiber link portion into an electric feedback signal;

mechanism for continuously comparing said feedback signal with said dither modulation signal and generating an error signal representing a difference between a frequency characteristic of said feedback signal and a dither modulation frequency; and wherein said grating writing source is responsive to said error signal for automatically adjusting a grating spacing formed in said optical fiber according to said error signal, said center wavelength of said optical signal and said center wavelength of said wavelength selective function resulting from said grating pattern becoming aligned when said frequency characteristic of said feedback signal is two times said dither modulation frequency.

15. The adaptive dispersion compensation system as claimed in claim 13, wherein said optical signal is a laser signal, said optical signal generator comprising:

a laser diode device for generating a laser signal; and, a laser bias voltage circuit for providing a bias voltage to said laser diode device for generating said laser signal.

16. The adaptive dispersion compensation system as claimed in claim 14, wherein said device for applying a dither modulation to said bias signal is a sinusoidal dither circuit for generating a sinusoidal dither modulation signal of a predetermined frequency.

17. The adaptive dispersion compensation system as claimed in claim 14, wherein said converting mechanism is a photodetector device.

18. The adaptive dispersion compensation system as claimed in claim 17, wherein said photodetector device is a p-i-n diode.

19. The adaptive dispersion compensation system as claimed in claim 16, wherein said device for comparing includes a mixer capable of combining said converted feedback signal with said sinusoidal dither modulation signal and generating a cross-product signal having components representing a sum and difference at dither frequencies.

20. The adaptive dispersion compensation system as claimed in claim 19, further including:

low-pass filter device for filtering said output cross-product signal; and integrator circuit for averaging said output cross-product signal to generate said error signal, whereby said error signal is positive or negative depending on whether a grating spacing being re-written is to be respectively increased for decreasing a center wavelength of said peaked wavelength selective function resulting from said grating or, whether a grating spacing is to be decreased for increasing a center wavelength of said peaked wavelength selective function resulting from said grating.

21. The adaptive dispersion compensation system as claimed in claim 13, wherein said optical fiber is a germanium-doped fiber.

22. The adaptive dispersion compensation system as claimed in claim 13, wherein said grating writing source includes an interferometer.

23. The adaptive dispersion compensation system as claimed in claim 13, wherein said grating writing source includes a phase mask and ultraviolet light source.

24. The adaptive dispersion compensation system as claimed in claim 13, wherein said grating writing source includes a laser signal source.

25. A method for writing a Bragg grating pattern to an optical fiber providing a communication channel for an optical network, said method comprising:

a) providing an optical signal capable of being communicated via a fiber optic link element providing said communication channel, said optical signal characterized as having an operating center wavelength associated with said channel;

b) writing a grating pattern on a portion of said optical fiber link, said grating pattern providing a peaked wavelength selective function including a center wavelength;

c) providing real-time adjustment of said grating pattern being written to said fiber optical link element by said source to thereby mutually align said center wavelength of said peaked wavelength selective function resulting from said grating with said center wavelength of said optical signal, wherein the resulting grating writing pattern enables optical signals to be optimally communicated over said communication channel.

26. The method as claimed in claim 25, wherein said step d) of providing real-time adjustment further comprises the steps of:

applying a dither modulation signal at a dither modulation frequency to said optical signal, and transmitting said dither modulated optical signal through said optical fiber link portion during writing of said grating pattern;

converting a portion of said dither modulated signal output from said optical fiber link portion into an electric feedback signal;

continuously comparing said feedback signal with said dither modulation signal and generating an error signal representing a difference between a frequency characteristic of said feedback signal and a dither modulation frequency; and automatically adjusting a grating spacing formed in said optical fiber according to said error signal, said center wavelength of said optical signal and said center wavelength of said wavelength selective function resulting from said grating pattern becoming aligned when said frequency characteristic of said feedback signal is two times said dither modulation frequency.

27. The method as claimed in claim 26, wherein said continuously comparing step includes the steps of:

combining said converted feedback signal with said dither modulation signal and generating a cross-product signal having components representing a sum and difference at dither frequencies;

filtering said output cross-product signal; and averaging said output cross-product signal to generate said error signal, whereby said error signal being positive or negative depending on whether a grating spacing being re-written is to be respectively increased for decreasing a center wavelength of said peaked wavelength selective function resulting from said grating or, whether a grating spacing is to be decreased for increasing a center wavelength of said peaked wavelength selective function resulting from said grating.

28. A method for adaptively compensating for dispersion effects in optical fiber elements, said optical fiber element having formed therein a tunable Bragg grating pattern providing a peaked wavelength selective function including a center wavelength, said method comprising the steps of:
   a) providing an optical signal capable of being communicated via a fiber optic link element providing a communication channel, said optical signal characterized as having an operating center wavelength associated with said channel;
   b) providing a grating writing source for re-writing said Bragg grating pattern on a portion of said optical fiber link;
   c) enabling real-time adjustment of said grating pattern being re-written to said fiber optical link element by said source to thereby mutually align said center wavelength of said peaked wavelength selective function resulting from said grating with said center wavelength of said optical signal, the resulting re-written grating pattern eliminating dispersion compensation effects of said communication channel.

29. The method for adaptively compensating for dispersion effects in optical fiber elements as claimed in claim 28, wherein said real-time adjustment step c) comprises the steps of:
   applying a dither modulation signal at a dither modulation frequency to said optical signal, and transmitting said dither modulated optical signal through said optical fiber link portion during re-writing of said grating pattern;
   converting a portion of said dither modulated signal output from said optical fiber link portion into an electric feedback signal;
   continuously comparing said feedback signal with said dither modulation signal and generating an error signal representing a difference between a frequency characteristic of said feedback signal and a dither modulation frequency, said grating writing source responsive to said error signal for automatically adjusting a grating spacing formed in said optical fiber according to said error signal,
   wherein said center wavelength of said optical signal and said center wavelength of said wavelength selective function resulting from said grating pattern becoming aligned when said frequency characteristic of said feedback signal is two times said dither modulation frequency.

30. The method for adaptively compensating for dispersion effects in optical fiber elements as claimed in claim 29, wherein said continuously comparing step includes the steps of:
   combining said converted feedback signal with said dither modulation signal and generating a cross-product signal having components representing a sum and difference at dither frequencies;
   filtering said output cross-product signal; and
   averaging said output cross-product signal to generate said error signal, whereby said error signal being positive or negative depending on whether a grating spacing being re-written is to be respectively increased for decreasing a center wavelength of said peaked wavelength selective function resulting from said grating or, whether a grating spacing is to be decreased for increasing a center wavelength of said peaked wavelength selective function resulting from said grating.

* * * * *